(12) United States Patent
Kang

(10) Patent No.: US 9,635,215 B2
(45) Date of Patent: Apr. 25, 2017

(54) METHOD OF PROCESSING IMAGE AND IMAGE FORMING APPARATUS USING THE SAME

(71) Applicant: Samsung Electronics Co., Ltd, Suwon-si, Gyeonggi-do (KR)

(72) Inventor: Ki-min Kang, Seongnam-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/208,275

(22) Filed: Mar. 13, 2014

(65) Prior Publication Data

US 2014/0192372 A1 Jul. 10, 2014

Related U.S. Application Data

(62) Division of application No. 12/552,345, filed on Sep. 2, 2009, now Pat. No. 8,705,854.

(30) Foreign Application Priority Data

Sep. 24, 2008 (KR) .......................... 10-2008-093646

(51) Int. Cl.

| | |
|---|---|
| G06K 15/00 | (2006.01) |
| H04N 1/40 | (2006.01) |
| H04N 1/60 | (2006.01) |
| G06K 9/00 | (2006.01) |
| G06K 9/34 | (2006.01) |
| H04N 1/23 | (2006.01) |
| H04N 1/46 | (2006.01) |

(52) U.S. Cl.
CPC ......... *H04N 1/40012* (2013.01); *H04N 1/233* (2013.01); *H04N 1/2307* (2013.01); *H04N 1/2369* (2013.01); *H04N 1/46* (2013.01)

(58) Field of Classification Search
None
See application file for complete search history.

(56) References Cited

U.S. PATENT DOCUMENTS 4,736,253 A * 4/1988 Shida ................... H04N 1/4055
358/2.1
4,953,013 A * 8/1990 Tsuji et al. ..................... 358/530
5,287,204 A * 2/1994 Koizumi .................. H04N 1/56
358/530

(Continued)

FOREIGN PATENT DOCUMENTS

| JP | 11-331626 | 11/1999 |
|---|---|---|
| KR | 10-2006-0031755 | 4/2006 |
| KR | 2008-0046080 | 5/2008 |

*Primary Examiner* — Madelein Nguyen
(74) *Attorney, Agent, or Firm* — Staas & Halsey LLP

(57) ABSTRACT

An image processing method and an image forming apparatus using the same. The method of processing includes dividing an image into a predetermined number of blocks, calculating an average of color signals of pixels existing in each of the blocks divided, classifying the blocks into color blocks and monochrome blocks using the calculated average, and determining whether the image is a color image or a monochrome image using a proportion of the color blocks. Accordingly, for a document wherein color and monochrome images are mixed, it is automatically determined whether an image is a color image or a monochrome image.

6 Claims, 6 Drawing Sheets

(56) References Cited

U.S. PATENT DOCUMENTS

| | | | | |
|---|---|---|---|---|
| 5,296,939 | A * | 3/1994 | Suzuki | G03G 15/01 358/453 |
| 5,515,096 | A * | 5/1996 | Fujimoto | 347/232 |
| 5,649,024 | A * | 7/1997 | Goldsmith | 382/170 |
| 5,715,073 | A * | 2/1998 | Miller | H04N 1/52 358/3.06 |
| 5,734,758 | A * | 3/1998 | Yamamoto et al. | 382/274 |
| 5,737,452 | A * | 4/1998 | Schiller | H04N 1/4051 358/3.2 |
| 5,761,070 | A * | 6/1998 | Conners | B07C 5/3422 345/426 |
| 5,799,137 | A * | 8/1998 | Broddin | H04N 1/40087 358/1.18 |
| 5,805,735 | A * | 9/1998 | Chen | G06T 9/005 358/524 |
| 5,850,293 | A * | 12/1998 | Suzuki | G06T 7/0083 358/3.27 |
| 6,005,680 | A * | 12/1999 | Luther et al. | 358/2.1 |
| 6,148,102 | A * | 11/2000 | Stolin | 382/164 |
| 6,357,856 | B1 * | 3/2002 | Otsuki | 347/43 |
| 6,474,777 | B1 * | 11/2002 | Fujita | B41J 2/2132 347/16 |
| 6,600,832 | B1 | 7/2003 | Nakayama et al. | 382/162 |
| 6,621,595 | B1 * | 9/2003 | Fan et al. | 358/3.26 |
| 6,707,491 | B1 * | 3/2004 | Choi | H04N 9/735 348/223.1 |
| 7,057,776 | B2 * | 6/2006 | Akiyama | 358/462 |
| 7,072,506 | B1 | 7/2006 | Hirota et al. | |
| 7,177,462 | B2 | 2/2007 | Hirota et al. | |
| 7,414,743 | B2 * | 8/2008 | Komaki | G06F 3/1204 358/1.13 |
| 7,889,372 | B2 * | 2/2011 | Iwasaki | G03G 15/50 358/1.13 |
| 8,345,308 | B2 * | 1/2013 | Park | H04N 1/0035 345/418 |
| 9,171,237 | B2 * | 10/2015 | Ohk | |
| 2001/0024584 | A1 * | 9/2001 | Kurosawa | G06K 15/129 400/76 |
| 2002/0024541 | A1 * | 2/2002 | Imaizumi et al. | 347/3 |
| 2002/0067508 | A1 * | 6/2002 | Nishikawa | G06K 15/00 358/1.18 |
| 2002/0069228 | A1 * | 6/2002 | Mori | G06K 15/00 715/201 |
| 2002/0089680 | A1 * | 7/2002 | Ishikawa | H04N 1/52 358/1.9 |
| 2003/0081032 | A1 * | 5/2003 | Akitaya | H04N 1/6016 347/15 |
| 2004/0113957 | A1 * | 6/2004 | Han | G06K 15/02 347/1 |
| 2004/0212825 | A1 * | 10/2004 | Sai | G03G 15/50 358/1.15 |
| 2004/0218217 | A1 * | 11/2004 | Dechamps | G06F 17/27 358/1.18 |
| 2004/0223172 | A1 * | 11/2004 | Yoshizawa | H04N 1/54 358/1.8 |
| 2005/0088701 | A1 * | 4/2005 | Uchida | H04N 1/00432 358/3.28 |
| 2005/0174586 | A1 * | 8/2005 | Yoshida | H04N 1/6019 358/1.9 |
| 2005/0264850 | A1 * | 12/2005 | Kim | B41J 2/17566 358/2.1 |
| 2006/0008139 | A1 * | 1/2006 | Hirota | H04N 1/56 382/162 |
| 2006/0279802 | A1 * | 12/2006 | Angal et al. | 358/462 |
| 2007/0115490 | A1 * | 5/2007 | Yada | H04N 1/4057 358/1.13 |
| 2008/0037068 | A1 * | 2/2008 | Yokoyama | H04N 1/3871 358/2.1 |
| 2008/0204810 | A1 * | 8/2008 | Cho | H04N 1/6072 358/3.03 |
| 2009/0310149 | A1 * | 12/2009 | Kawasaki | H04N 1/6022 358/1.8 |
| 2009/0317000 | A1 * | 12/2009 | Efimov | G06K 9/3208 382/216 |
| 2010/0060917 | A1 * | 3/2010 | Watanabe | H04N 1/56 358/1.9 |
| 2010/0195162 | A1 * | 8/2010 | Majewicz | G09G 5/028 358/3.23 |
| 2010/0239166 | A1 * | 9/2010 | Zhang et al. | 382/176 |
| 2011/0102844 | A1 * | 5/2011 | Sei | G06F 3/1211 358/1.15 |
| 2013/0169984 | A1 * | 7/2013 | Oya | B41J 2/2114 358/1.9 |

\* cited by examiner

METHOD OF PROCESSING IMAGE AND IMAGE FORMING APPARATUS USING THE SAME

CROSS-REFERENCE TO RELATED APPLICATIONS

This is a Divisional application of prior application Ser. No. 12/552,345, filed on Sep. 2, 2009, in the United Stated Patent and Trademark Office, which claims priority under 35 U.S.C. §119 (a) from Korean Patent Application No. 10-2008-093646, filed on Sep. 24, 2008, in the Korean Intellectual Property Office, the disclosure of which is incorporated herein by reference in its entirety.

BACKGROUND

1. Field of the Invention

The present general inventive concept relates to a method of processing an image and an image forming apparatus using the same, and more particularly, to a method of processing an image, which determines whether to perform a color printing or a monochrome printing based on whether an input image is a color image or not, and an image forming apparatus using the same.

2. Description of the Related Art

Image forming apparatuses supporting color copying can perform both of monochrome copying and color copying operations. In general, such image forming apparatuses are provided with a button to select monochrome copying or color copying so that a user can select either one based on whether a document in use is a monochrome image or a color image.

The monochrome copying or the color copying are selectively performed based on user's determination of whether a document is a monochrome image or a color image, so that efficiency is expected in view of a copying speed and utilization of toner.

However, if a large number of documents are fed by an automatic document feeder (ADF) to be copied, it is difficult for a user to determine whether the documents are color image or a monochrome image sheet by sheet. Therefore, if a large number of documents are copied using the ADF, most users performs color copying with respect to all of the documents. In this case, efficiency is not expected in view of a coping speed and utilization of toner.

Also, if scanned documents are transmitted as color images through a network despite the fact that monochrome documents and color documents are mixed in the scanned documents, a transfer rate is lowered due to increased amount of data.

SUMMARY

The present general inventive concept provides a method of processing an image, which can determine whether a block is a color block or a monochrome block using an average of color signals calculated in the block, and determine whether an image is a color image or a monochrome image using a result of the above determination, and an image forming apparatus using the same.

Additional features and utilities of the present general inventive concept will be set forth in part in the description which follows and, in part, will be obvious from the description, or may be learned by practice of the general inventive concept.

Embodiments of the present general inventive concept can be achieved by providing a method of processing an image of an image forming apparatus, the method including, among other things, dividing an image into a predetermined number of blocks, calculating an average of color signals of pixels in each of the blocks, classifying the blocks into color blocks and monochrome blocks using the calculated average, and determining whether the image is a color image or a monochrome image according to a proportion of the color blocks.

The method may further include receiving an RGB image and converting the RGB image into predetermined color coordinates, where the color signals of the pixels may be color signals of the converted color coordinates.

The classifying of the blocks may include classifying the block as one of the monochrome blocks if the average of the color signals falls within a predetermined threshold range, and classifying the block as one of the color blocks if the average of the color signals is outside the predetermined threshold range.

The method may further include receiving an RGB image, and the color signals of the pixels may be R, G, B values of the RGB image.

The classifying of the blocks may include calculating a maximum value and a minimum value of averages of the R, G, B values and classifying the block as one of the monochrome blocks if a difference between the maximum value and the minimum value is less than a predetermined threshold and classifying the block as one of the color blocks if the difference is greater than or equal to the predetermined threshold.

The proportion of the color blocks may be calculated by the following equation:

$$Color_{ratio} = \frac{N_{color}}{N_{total}}$$

where $Color_{ratio}$ denotes a proportion of color blocks, $N_{color}$ denotes the number of the classified color blocks, and $N_{total}$ denotes the number of total blocks.

The determining whether the image is a color image or a monochrome image may include determining that the image is a color image if the proportion of the color blocks is greater than or equal to a predetermined threshold and determining that the image is a monochrome image if the proportion of the color blocks is less than the predetermined threshold.

The method may further include determining connectivity of the classified color blocks.

The determining connectivity may include determining that the color blocks have connectivity if the number of continuous color blocks is greater than or equal to a predetermined number, and determining that the color blocks do not have connectivity if the number of continuous color blocks is less than the predetermined number.

The determining whether the image is the color image or a monochrome image may include determining that the image is a color image if the color blocks are determined to have connectivity and determining that the image is a monochrome image if the color blocks are not determined to have connectivity.

The method may further include performing a color printing if the image is determined to be a color image and performing a monochrome printing if the image is determined to be a monochrome color image.

The method may further include compressing the image in a compression format suitable for a color image if the image is determined to be a color image, and compressing the image in a compression format suitable for a monochrome image if the image is determined to be a monochrome image.

Embodiments of the present general inventive concept can also be achieved by providing an image forming apparatus, including, among other things, a block divider to divide an image into a predetermined number of blocks, an average calculator to calculate an average of color signals of pixels in each of the blocks, a block determiner to classify the blocks into color blocks and monochrome blocks using the calculated average, and an image determiner to determine whether the image is a color image or a monochrome image using a proportion of the classified color blocks.

The image forming apparatus may further include a scanner to input an RGB image; and a color coordinates converter to convert the RGB image to predetermined color coordinates, where the color signals of the pixels may be color values of the converted color coordinates.

The block determiner may classify the block as one of the monochrome blocks if the average of the color values falls within a predetermined threshold range, and may classify the block as one of the color blocks if the average of the color values is out of the predetermined threshold range.

The image forming apparatus may further include a scanner to input an RGB image, and the color signals of the pixels may be R, G, B values of the RGB image.

The block determiner may calculate a maximum value and a minimum value of averages of the R, G, B values, and may classify the block as one of the monochrome blocks if a difference between the maximum value and the minimum value is less than a predetermined threshold, and may classify the block as one of the color blocks if the difference is greater than or equal to the predetermined value.

The proportion of the color blocks may be calculated by the following equation:

$$Color_{ratio} = \frac{N_{color}}{N_{total}}$$

where $Color_{ratio}$ denotes a proportion of color blocks, $N_{color}$ denotes the number of classified color blocks, and $N_{total}$ denotes the number of total blocks.

The image determiner may determine that the image is a color image if the proportion of the color blocks is greater than or equal to a predetermined threshold, and may determine that the image is a monochrome image if the proportion of the color blocks is less than the predetermined threshold.

The image determiner may determine connectivity of the classified color blocks.

The image determiner may determine that the color blocks have connectivity if the number of continuous color blocks is greater than or equal to a predetermined number, and may determine that the color blocks do not have connectivity if the number of continuous color blocks is less than the predetermined number.

The image determiner may determine that the image is a color image if the color blocks are determined to have connectivity and may determine that the image is a monochrome image if the color blocks are not determined to have connectivity.

The image forming apparatus may further include a printer to perform a color printing if the image is determined to be a color image, and to perform a monochrome printing if the image is determined to be a monochrome image.

The image forming apparatus may further include a controller to compress the image in a compression format suitable for a color image if the image is determined to be a color image, and to compress the image in a compression format suitable for a monochrome image if the image is determined to be a monochrome image.

Embodiments of the present general inventive concept can also be achieved by providing an image forming apparatus including, among other things, a scanner to scan an image in which R, G, and B colors are mixed in a constant proportion, and a printer to perform a monochrome printing for the scanned image.

The image forming apparatus may further include a block divider to divide the scanned image into a predetermined number of blocks, an average calculator to calculate an average of color signals of pixels in each of the blocks, a block determiner to classify the blocks into color blocks and monochrome blocks using the calculated average, and an image determiner to determine that the image is a monochrome image using a proportion of the classified color blocks, and the printer may perform the monochrome printing if the image is determined to be a monochrome image.

Embodiments of the present general inventive concept can also be achieved by providing a method of processing an image including, among other things, determining whether the image is a color image or a monochrome image according to a connectivity of the image.

BRIEF DESCRIPTION OF THE DRAWINGS

The above and/or other features and utilities of the present general inventive concept will become apparent and more readily appreciated from the following description of the embodiments, taken in conjunction with the accompanying drawings of which.

DETAILED DESCRIPTION OF THE EMBODIMENTS

Figure 1:
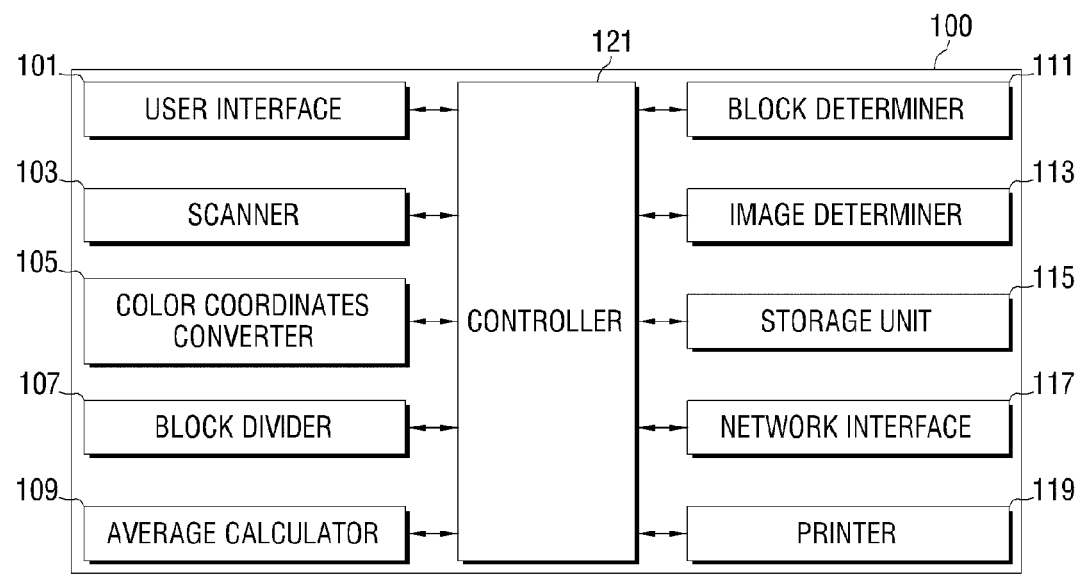
FIG. 1 is a block diagram illustrating an image forming apparatus according to an exemplary embodiment of the present general inventive concept.

Reference will now be made in detail to exemplary embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating an image forming apparatus according to an exemplary embodiment of the present general inventive concept.

Referring to FIG. 1, an image forming apparatus 100 according to an exemplary embodiment of the present general inventive concept includes a user interface 101, a scanner 103, a color coordinates converter 105, a block divider 107, an average calculator 109, a block determiner 111, an image determiner 113, a storage unit 115, a network interface 117, a printer 119, and a controller 121.

The user interface 101 supports interface between a user and the image forming apparatus 100, and receives a request signal to request operations of copying, scanning, and printing, for example.

The scanner 103 scans a document to generate an image. In general, the scanner 103 scans a document to generate a red, green, blue (RGB) image having R, G, and B values.

The color coordinates converter 105 converts the RGB image to predetermined color coordinates. The color coordinates may be YCbCr, Lab, XYZ, and LUV color coordinates which are expressed by brightness values and color values.

In this exemplary embodiment, the color coordinates converter 105 converts the RGB image to YCbCr color coordinates which are mainly used in the image forming apparatus 100. The color coordinates converter 105 may be omitted, thus the R, G, and B values of the RGB image may be used instead of converted color coordinates.

The block divider 107 divides an image into a predetermined number of blocks. For example, the block divider 107 may divide an image into M×N blocks, where M>1 and N>1.

The average calculator 109 calculates an average of color signals of pixels in each block that has been divided by the block divider 107.

If the RGB image is converted into the YCbCr color coordinates by the color coordinates converter 105, the color signals of the pixels are Cb values and Cr values. In this case, the average calculator 109 calculates an average of Cb values and an average of Cr values of pixels existing in each block. Since the brightness value Y is not necessary for determining whether an image is a color image or a monochrome image, only the averages for Cb values and Cr values are calculated.

If the RGB image has not been converted into color coordinates, the color signals of pixels are R, G, B values. In this case, the average calculator 109 calculates an average of R values, an average of G values, and an average of B values of pixels existing in each block.

The block determiner 111 classifies a corresponding block into a color block or a monochrome block using the average value of color signals of pixels calculated for each block by the average calculator 109. How to classify a block into a color block or a monochrome color block differs depending on which color coordinates are applied to the color signals used in the color coordinates converter 105.

Regarding color signals of Cb and Cr values, the block determiner 111 classifies a corresponding block into a monochrome block if averages of the Cb values and of the Cr values fall within a predetermined threshold range, and classifies a block into a color block if the averages of the Cb values and the Cr values are outside of the predetermined threshold range.

The determination described above is expressed by equation 1 as follows:

$$Cb\_TH\_Low < \text{mean}(Cb) < Cb\_TH\_High$$

$$Cr\_TH\_Low < \text{mean}(Cr) < Cr\_TH\_High \qquad [\text{Equation 1}]$$

wherein "mean (Cb)" and "mean (Cr)" denote averages of Cb values and of Cr values, respectively, "Cb_TH_Low" and "Cr_TH_Low" denote minimum threshold values of Cb values and of Cr values, respectively, and "Cb_TH_High" and "Cr_TH_High" denote maximum threshold values of Cb values and of Cr values, respectively.

The block determiner 111 classifies a corresponding block into a monochrome block if both of the averages of the Cb values and of the Cr values satisfy equation 1, and classifies a corresponding block into a color block if one of the averages of the Cb values and of the Cr values satisfies equation 1 or both of them does not satisfy equation 1. In other words, if both of the averages of the Cb values and Cr values are between their respective maximum and minimum thresholds, then the block is classified as a monochrome block, otherwise the block is classified as a color block.

If the color signals are R, G, B values, the block determiner 111 calculates a minimum value and a maximum value of average values of the respective R, G, B values, and classifies a corresponding block into a monochrome block if a difference between the maximum value and the minimum value is less than a predetermined threshold, and classifies a corresponding block into a color block if a difference between the maximum value and the minimum value is greater than or equal to the predetermined threshold.

For example, each individual block may have a plurality of pixels, and each pixel may include an R, G, and B value. In this example, there is one block, and this block has two pixels. The first pixel may have an R, a G, and a B value of "0"; the R, G, and B values of this pixel are calculated by the block determiner 111 as part of the minimum average of the R, G, and B, values. The second pixel may have an R, a G, and a B value of "255"; the R, G, and B values of this pixel are calculated by the block determiner 111 as part of the maximum average of the R, G, and B values. The minimum average may be subtracted from the maximum average, and compared to the predetermined threshold. If the difference between the maximum value and the minimum value is less than the threshold, the block is classified as a monochrome block. Otherwise, the block is classified as a color block.

Additionally, the block determiner 111 may calculate the maximum average and the minimum average as follows. In each pixel, the R, G, and B value may be treated separately. For example, if the R value is "10", the G value is "40", and the B value is "210", the R value and the G value may be calculated as part of the minimum average, and the R value may be calculated as part of the maximum average. The block determiner 111 may also include a predetermined value, where R, G, and B values that are less than the predetermined value are calculated as part of the minimum average, and R, G, and B values that are greater than or equal to the predetermined value are calculated as part of the maximum average. For example, if the predetermined value is "128", a pixel with R, G, and B values of "5", "128", and "200", respectively, would calculate the R value of "5" as part of the minimum average, and the G value of "128" and the B value of "200" as part of the maximum average.

In another example, the block determiner 111 may calculate a pixel as part of the maximum or minimum average based on the R, G, and B values together. For example, if the R value is "2", the G value is "216" and the B value is "180", the block determiner 111 may determine that the R, G, and B values of this pixel are used to calculate the maximum average.

The determination described, and exemplified, above is expressed by equation 2 as follows:

$$\text{Max}(\text{mean}(R), \text{mean}(G), \text{mean}(B))$$

$$\text{Min}(\text{mean}(R), \text{mean}(G), \text{mean}(B))$$

$$(\text{Max}-\text{Min}) < RGB\_TH \qquad \text{[Equation 2]}$$

wherein "mean (R)", "mean (G)", and "mean (B)" denote average values of respective R, G, and B values, and "RGB_TH" denotes a predetermined threshold for the RGB image.

The block determiner 111 classifies a corresponding block into a monochrome block if a difference between a maximum value and a minimum value of average values of the respective R, G, B values (Max−Min) satisfies the third line equation of equation 2 ((Max−Min)<RGB_TH), and classifies a corresponding block into a color block if the difference does not satisfy the third line equation. If the difference between the maximum value and the minimum value is "0", the corresponding block is an entirely complete monochrome block.

The block determiner 111 classifies one or more of the blocks of the image into monochrome blocks and color blocks by assigning "0" to monochrome blocks and "1" to color blocks.

The image determiner 113 calculates a proportion of the color blocks using a result of classifying blocks into color blocks or monochrome blocks and determines connectivity of the color blocks, and determines whether the image is a color image or not using the proportion of the color blocks and the connectivity. In other words, the image determiner 113 determines whether the image is a color image or a monochrome image.

The image determiner 113 may calculate a proportion of the color blocks using equation 3 as follows:

$$Color_{ratio} = \frac{N_{color}}{N_{total}} \qquad \text{[Equation 3]}$$

where $Color_{ratio}$ denotes a proportion of color blocks, $N_{color}$ denotes the number of classified color blocks, and $N_{total}$ denotes the number of total blocks.

The image determiner 113 calculates a proportion of the color blocks using equation 3, and determines that a current image is a color image if the proportion of the color blocks is greater than or equal to a predetermined threshold, and determines that a current image is a monochrome image if the proportion is less than the predetermined threshold.

The image determiner 113 determines the presence of connectivity if the number of continuous color blocks is greater than or equal to a predetermined number, and determines the absence of connectivity if the number of continuous color blocks is less than the predetermined number. For example, if there are three color blocks adjacent to each other in a horizontal direction, the number of continuous color blocks is three.

In order to determine if the number of continuous color blocks is greater than or equal to a predetermined number, the image determiner 113 determines whether the number of continuous color blocks in a horizontal direction is greater than or equal to a predetermined number "P" or whether the number of continuous color blocks in a vertical direction is greater than or equal to a predetermined number "Q". The image determiner 113 may also determine whether the number of continuous color blocks in a diagonal direction is greater than or equal to a predetermined number.

The image determiner 113 identifies how many continuous color blocks are in a row, and determines the presence of connectivity if the largest number of continuous color blocks is greater than or equal to "P". If the largest number of horizontal continuous color blocks is greater than or equal to "P", connectivity is set to "1". The image determiner 113 identifies how many continuous color blocks are in a column, and determines the presence of connectivity if the largest number of continuous color blocks is greater than or equal to "Q". If the largest number of vertical continuous color blocks is greater than or equal to "Q", the connectivity is set to "1." Otherwise, the connectivity is set to "0".

The image determiner 113 may determine the presence of connectivity for an entire image. For example, if there is connectivity in one row, one column, or one diagonal direction, connectivity may be set to "1." In another example, the image determiner 113 may determine the presence of connectivity for each row and column, then determine the presence of connectivity for the image based on a predetermined threshold. The image determiner 113 may calculate 10 rows, in which 3 have connectivity, to have an overall connectivity that may be based on a ratio of rows with connectivity compared to total rows expressed as a percentage, i.e., 3:10, or 30%. This percentage is then multiplied by the value associated with connectivity, in this case "1", and an overall connectivity of the rows may be determined to be "0.3". Additionally, the image determiner 113 may calculate 10 columns, in which 6 have connectivity, to have an overall connectivity of 0.6 by a similar method. The image determiner 113 may then determine an average connectivity of the rows and columns, in this case 0.45. This average connectivity is compared to a predetermined threshold, in this case, 0.5, corresponding to a predetermined threshold of the percentage of connectivity. Therefore, since, in this example the average connectivity of 0.45 is less than the predetermined threshold of 0.5, the image determiner 113 may determine that the image does not have connectivity.

The image determiner 113 determines that a current image is a color image if the proportion of color blocks is greater than or equal to a predetermined threshold. If the proportion of color blocks is less than a predetermined threshold, the image determiner 113 determines whether the color blocks have connectivity. If the connectivity of the image is set to "1", the image determiner 113 determines that a current image is a color image, and if the connectivity of the image is set to "0", the image determiner 113 determines that a current image is a monochrome image.

The storage unit 115 may store an image scanned by the scanner 103 and an image previously input by the image forming apparatus 100. Also, the storage unit 115 may store color coordinates converted by the color coordinates converter 105 or temporarily store the numbers of continuous color blocks in rows and columns in order for the image determiner 113 to determine connectivity of color blocks.

The network interface 117 supports interface between the image forming apparatus 100 and a network. The image forming apparatus 100 may transmit an image to other devices such as terminal devices (not illustrated) or external storage media (not illustrated) through the network interface 117.

The printer 119 outputs an image. The image forming apparatus 100 supports both of a color printing and a monochrome printing such that the printer 119 performs a color printing or a monochrome printing according to user's selection or according to a result of determination of the image determiner 113.

The controller 121 controls the operation of the image forming apparatus 100. In other words, the controller 121 may control input and output of signals among the user interface 101, the scanner 103, the color coordinates converter 105, the block divider 107, the average calculator 109, the block determiner 111, the image determiner 113, the storage unit 115, the network interface 117, and the printer 119, or any combination thereof.

For example, if the image forming apparatus 100 performs a copying operation, the controller 121 controls the scanner 103 to scan a document and generate an image, controls the block divider 107, the average calculator 109, the block determiner 111, and the image determiner 113 to determine whether the image is a color image or a monochrome image, and controls the printer 119 to output a color image or a monochrome image according to the output received from the image determiner 113.

In transmitting the image to other devices, the controller 121 may compress the color image or the monochrome image determined by operations of the block divider 107, the average calculator 109, the block determiner 111, and the image determiner 113 in a corresponding format, and controls the network interface 117 to transmit the compressed color image or monochrome image to the other devices.

As described above, the image forming apparatus 100 divides a single image into a plurality of blocks, determines whether each block is a color block or a monochrome block using an average of color signals of pixels existing in each block, and determines whether a corresponding image is a color image or a monochrome image using a proportion of color blocks.

Accordingly, if the scanner 103 scans an image in which R, G, B colors are mixed in a constant proportion, the image determiner 113 determines that a corresponding image is a monochrome image. Therefore, if a document having R, G, B colors mixed in a constant proportion is copied by the image forming apparatus 100, the printer 119 performs a monochrome printing in spite of the fact that the document fed to the image forming apparatus 100 is a color document.

Figures 2A, 2B:
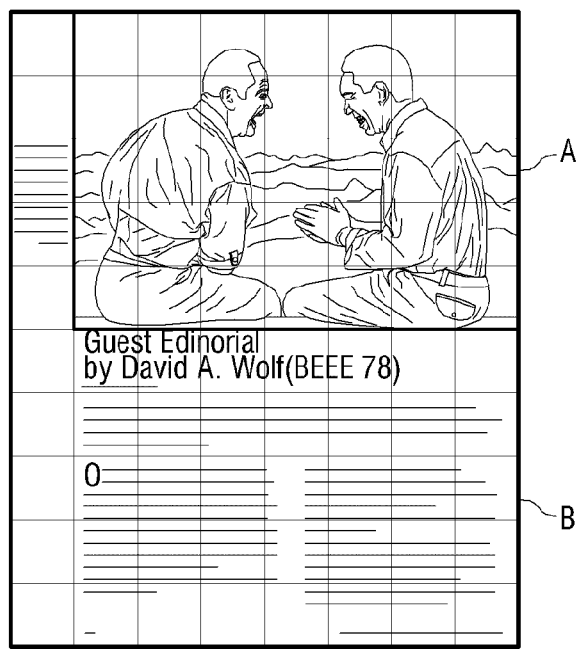
FIGS. 2A and 2B are views illustrating operations of a block divider and a block determiner illustrated in FIG. 1.

FIGS. 2A and 2B are views to explain operations of the block divider and the block determiner of FIG. 1.

FIG. 2A illustrates an image scanned by the scanner 103, which includes an area "A" in which a polychrome picture is displayed and an area "B" in which black texts are displayed, for example. The block divider 107 divides the image into 8×10 blocks, or alternatively 10 rows and 8 columns of blocks.

FIG. 2B illustrates an example of classifying the blocks divided from the image by the block divider 107 into color blocks or monochrome blocks using the block determiner 111. Blocks for the area "A" including a polychrome picture are determined to be color blocks and are set to "1", whereas blocks for the area "B" including black texts only are determined to be monochrome blocks and are set to "0".

The exemplary embodiments illustrated in FIGS. 2A and 2B are for illustration purposes only, and the block divider 107 can divide an image into any number of blocks, or any number of rows and columns, depending on the size of the image. As the number of blocks increases, a processing speed for determining whether the image is a color image or a monochrome image may decrease, but determination is more accurate than determination with a small number of blocks.

Figure 3:
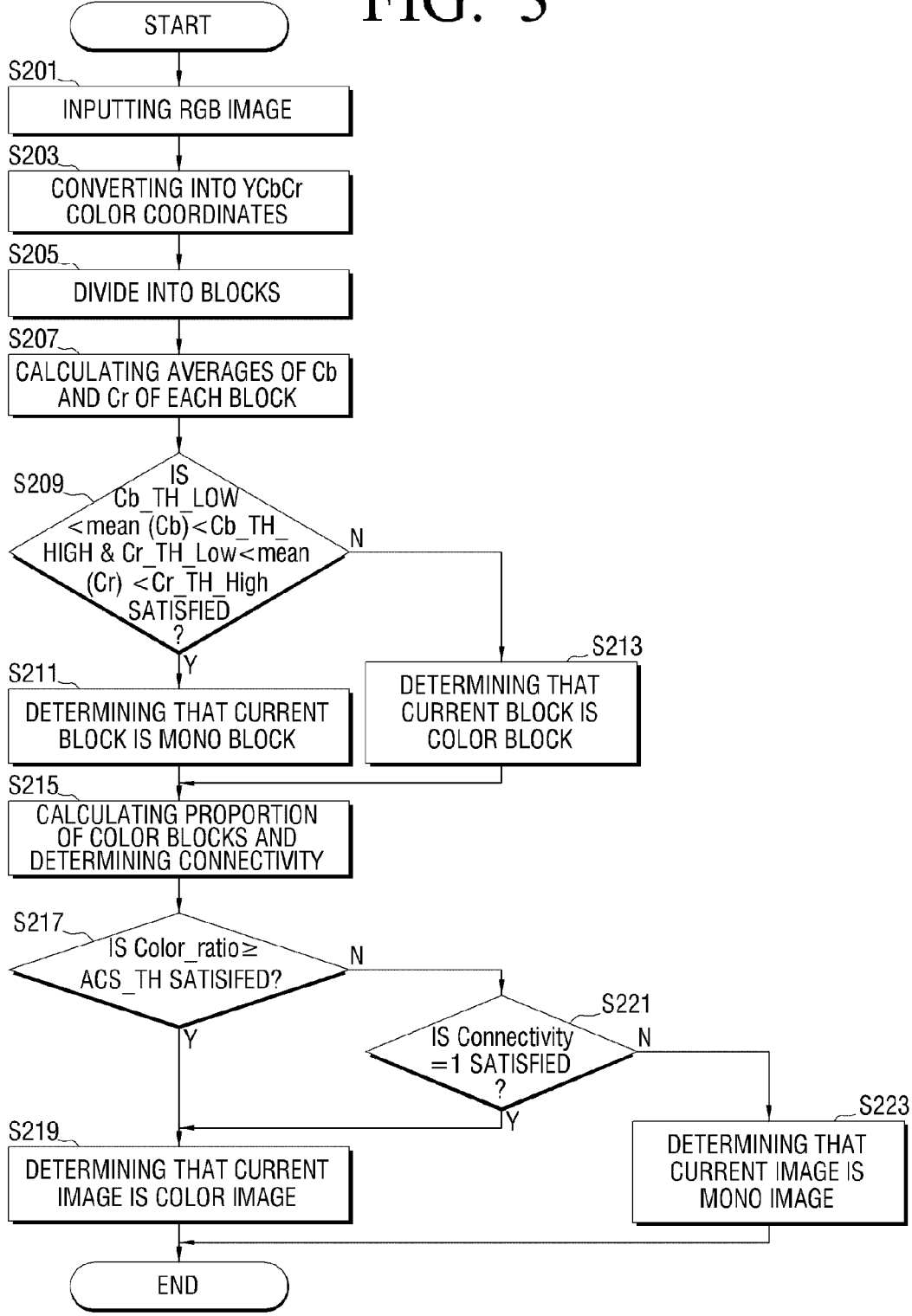
FIG. 3 is a flowchart illustrating a method of determining whether an image is a color image or a monochrome image according to an exemplary embodiment of the present general inventive concept.

FIG. 3 is a flowchart illustrating a method of determining whether an image is a color image or a monochrome image according to an exemplary embodiment of the present general inventive concept.

If a document is fed into the image forming apparatus 100, the scanner 103 scans the document and generates an RGB image for each page of the document in operation S201. The RGB image generated by the scanner 103 has R, G, B values and the RGB image is transmitted to the color coordinates converter 105.

The color coordinates converter 105 converts the RGB image into YCbCr color coordinates in operation S203. Although the image forming apparatus 100 uses the YCbCr color coordinates in this exemplary embodiment, different color coordinates having brightness values and color values may be used.

The block divider 107 divides the image into M×N blocks in operation S205. The number of blocks divided by the block divider 107 is variable and differs depending on the size of an image.

The average calculator 109 calculates average values of Cb values and of Cr values for each block divided by the block divider 107 in operation S207. An average value of Cb values is denoted by "mean (Cb)" and an average value of Cr values is denoted by "mean (Cr)". The mean (Cb) and the mean (Cr) calculated by the average calculator 109 are provided to the block determiner 111.

The block determiner 111 determines whether the mean (Cr) and the mean (Cr) fall within a threshold range or not. That is, as mentioned in equation 1, the block determiner 111 determines whether the mean (Cb) falls within the range between Cb_TH_Low and Cb_TH_High or not and whether the mean (Cr) falls within the range between Cr_TH_Low and Cr_TH_High or not in operation S209.

If both of the mean (Cb) and the mean (Cr) fall within the threshold range (if both satisfy equation 1) in operation S209-Y, the block determiner 111 determines that a current block is a monochrome block in operation S211.

If both of the mean (Cb) and the mean (Cr) are out of the threshold range, or if one of the mean (Cb) and the mean (Cr) falls within the threshold range (if both of them do not satisfy equation 1) in operation S209-N, the block determiner 111 determines that a current block is a color block in operation S213.

After the block determiner 111 classifies blocks into color blocks and monochrome blocks, the image determiner 113 calculates a proportion of the color blocks using equation 3 and determines connectivity of color blocks based on the number of continuous color blocks in a horizontal direction and in a vertical direction in operation S215.

The image determiner 113 compares the proportion of the color blocks (Color$_{ratio}$) with a predetermined threshold (ACS_TH) in operation S217. If the Color$_{ratio}$ is greater than or equal to the ACS_TH in operation S217-Y, the image determiner 113 determines that a current image is a color image in operation S219.

Also, if the Color$_{ratio}$ is less than the ACS_TH in operation S217-N, the image determiner 113 determines whether connectivity is "1" in operation S221. If connectivity is "1" in operation S221, the image determiner 113 determines that a current image is a color image in operation S219, and if connectivity is "0", the image determiner 113 determines that a current image is a monochrome image in operation S223.

If more than one document is fed through the ADF, the operations S201 to S223 may be performed on at least one of the documents. For example, determining whether an image is a color image or a monochrome image may be performed with respect to each page of at least one document, from the first page of the first document to the final page of the last document.

Figure 4:
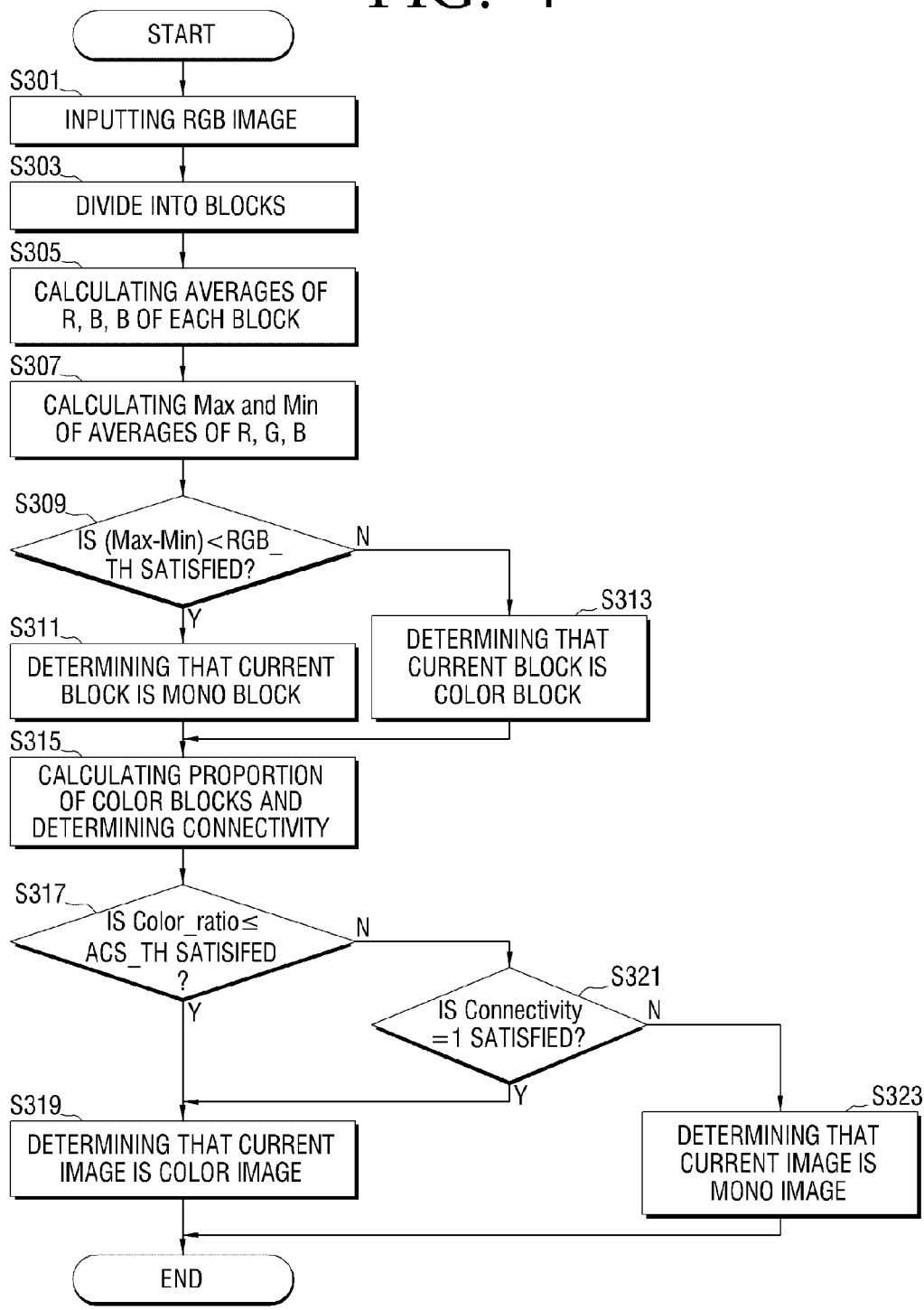
FIG. 4 is a flowchart illustrating a method of determining whether an image is a color image or a monochrome image according to another exemplary embodiment of the present general inventive concept.

FIG. 4 is a flowchart illustrating a method of determining whether an image is a color image or a monochrome image according to another exemplary embodiment of the present general inventive concept.

An RGB image is input in operation S301. The RGB image may be an image generated by the scanner 103 scanning a document or one of images pre-stored in the storage unit 115.

The block divider 107 divides the RGB image into blocks in operation S303, and the average calculator 109 calculates an average of each of R, G, B values contained in each block in operation S305.

The block determiner 111 calculates a maximum value and a minimum value of averages of the R, G, B values calculated by the average calculator 109 in operation S307. This calculation is expressed by the first and the second equations of equation 2.

The block determiner 111 determines a difference between the maximum value and the minimum value of the average values of R, G, B values falls within a predetermined threshold range or not in operation S309. If the difference (Max−Min) is less than RGB_TH in operation S309-Y, the block determiner 111 determines that a current block is a monochrome block in operation S311. If the difference (Max−Min) is greater than or equal to RGB_TH in operation S309-N, the block determiner 111 determines that a current block is a color block in operation S313.

The image determiner 113 calculates a proportion of the color blocks using equation 3, and determines connectivity of color blocks based on the number of continuous color blocks in a horizontal direction and a vertical direction in operation S315.

The image determiner 113 compares a proportion of color blocks ($Color_{ratio}$) with a predetermined threshold (ACS_TH) in operation S317. If the $Color_{ratio}$ is greater than or equal to the ACS_TH in operation S317-Y, the image determiner 113 determines that a current image is a color image in operation S319.

If $Color_{ratio}$ is less than the ACS_TH in operation S317-N, the image determiner 113 determines whether connectivity is "1" or not in operation S321. If connectivity is "1" in operation S321, the image determiner 113 determines that a current image is a color image in operation S319, and if connectivity is "0", the image determiner 113 determines that a current image is a monochrome image in operation S323.

If more than one document is fed through the ADF, the operations S301 to S323 of FIG. 4 are performed on at least one of the documents. For example, determining whether an image is a color image or a monochrome image may be performed with regard to each page of the at least one document, from the first page of the first document to the final page of the last document.

Figure 5:
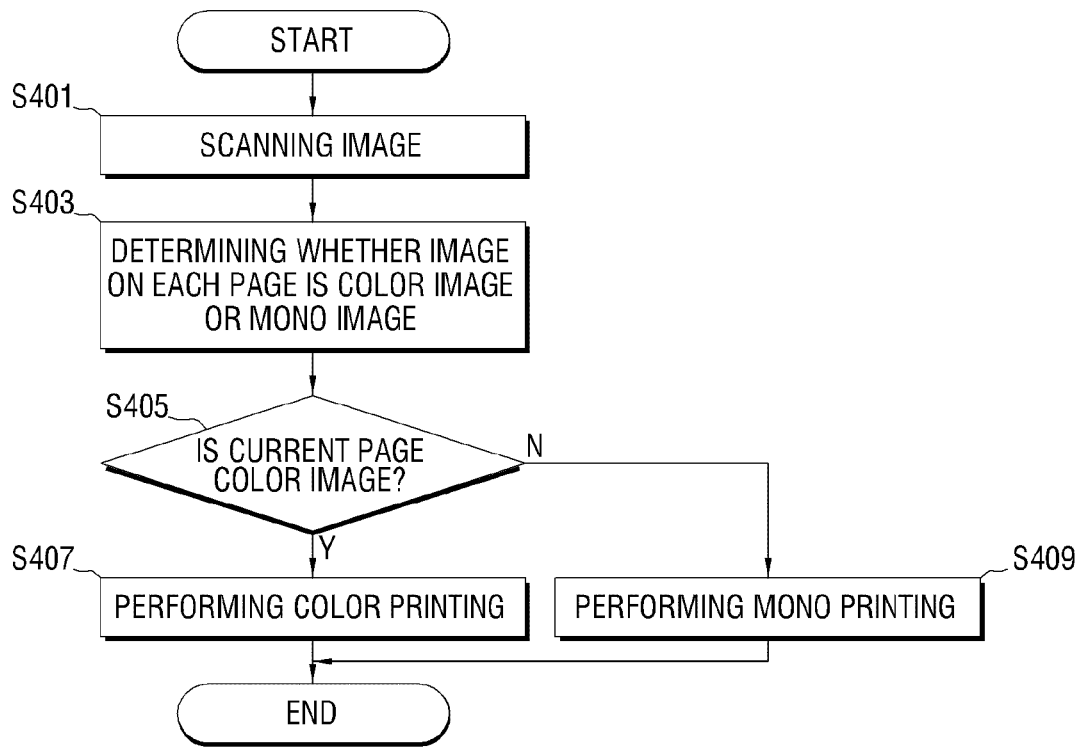
FIG. 5 is a flowchart illustrating a method of processing an image according to an exemplary embodiment of the present general inventive concept.

FIG. 5 is a flowchart illustrating a method for processing an image according to an exemplary embodiment of the present general inventive concept.

The scanner 103 scans a document and inputs an RGB image in operation S401, and the image on at least one page of the document is determined to be a color image or a monochrome image by the method illustrated in FIG. 3 or 4 in operation S403.

The controller 121 determines whether a current page is a color image or a monochrome image in operation S405. If a current page is determined to be a color image, the controller 121 controls the printer 119 to perform a color printing in operation S407. Also, if a current page is determined to be a monochrome image in operation S405, the controller 121 controls the printer 119 to perform a monochrome printing in operation S409.

According to the above-described exemplary method, if a plurality of sheets of a document are scanned, a coloring printing or a monochrome printing is selectively performed according to whether an image on at least one page is determined to be a color image or a monochrome image. Accordingly, if a plurality of sheets of document in which color images and monochrome images are mixed is copied, a color copying or a monochrome copying is performed according to the original document.

Figure 6:
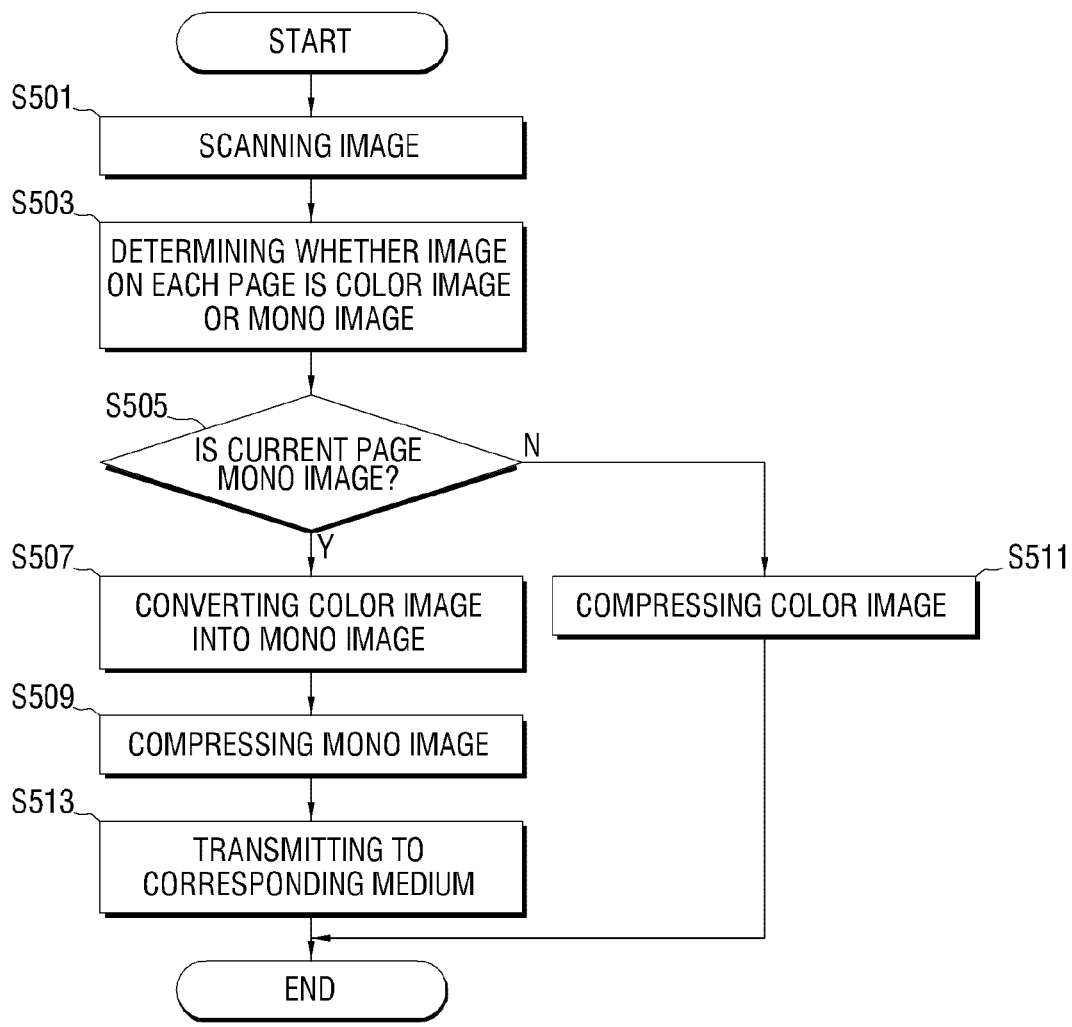
FIG. 6 is a flowchart illustrating a method of processing an image according to another exemplary embodiment of the present general inventive concept.

FIG. 6 is a flowchart illustrating a method of processing an image according to another exemplary embodiment of the present general inventive concept.

The scanner 103 scans a document and inputs a RGB image for each page of the document in operation S501. The image on each page is determined to be a color image or a monochrome image by, for example, the method illustrated in FIG. 3 or 4 in operation S503.

The controller 121 determines whether a current page is a monochrome image or a color image in operation S505. If the current page is determined to be a color image, the controller 121 compresses the color image in a compression format suitable for the current color image in operation S511.

If the current page is determined to be a monochrome image, the controller 121 converts the image, which may include a mix of color and monochrome portions, into a monochrome image in operation S507 and selectively and/or optionally compresses the monochrome image in a compression format suitable for the monochrome image in operation S509.

The controller 121 controls the network interface 117 to transmit the images that may be compressed to color or monochrome images to a corresponding medium in operation S513. The medium may be a user terminal device or an external storage medium.

As described above, if a plurality of sheets of a document are scanned, the image on each page is determined to be a color image or a monochrome image, and the image may be compressed in a different compression format according to whether the image is a color image or a monochrome image. Accordingly, unnecessary transmission of a color image can be minimized or prevented in transmitting the image through the network and thus a low transfer rate can be solved.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, Blu-Ray discs, magnetic tapes, floppy disks, optical data storage devices, and the like. The computer-readable recording medium can also be distributed over network coupled computer systems so that the computer-readable code is stored and executed in a distributed fashion. Also, functional programs, codes, and code segments to accomplish the present general inventive concept can be easily construed by programmers skilled in the art to which the present general inventive concept pertains.

Although exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. An image forming apparatus comprising:
a scanner to scan a document having a plurality of sheets and to generate one image for each sheet of the document;
a processor to determine whether the one generated image for each sheet of the document is a color image or a monochrome image; and
a printer to perform a color printing of each sheet having the image which is determined to be the color image, and to perform a monochrome printing of each sheet having the image which is determined to be the monochrome image,
wherein the processor divides each generated image into a predetermined number of blocks, calculates an average of color signals of pixels in each of the blocks having one or more color signals, compares the calculated average with a predetermined threshold to classify the blocks into one of color blocks and monochrome blocks based on whether the calculated average is greater than or less than the predetermined threshold, and determines whether each image is the color image or the monochrome image using a proportion of the classified color blocks.

2. The image forming apparatus as claimed in claim 1, wherein the processor comprises:
a block divider to divide each generated image into the predetermined number of blocks;
an average calculator to calculate the average of color signals of pixels in each of the blocks;
a block determiner to classify the blocks into color blocks and monochrome blocks using the calculated average; and
an image determiner to determine each monochrome image using the proportion of the classified color blocks.

3. The image forming apparatus as claimed in claim 2, wherein the block determiner classifies the block as one of the monochrome blocks if the average of the color values falls within a predetermined threshold range, and classifies the block as one of the color blocks if the average of the color values is out of the predetermined threshold range.

4. The image forming apparatus as claimed in claim 2, wherein the image determiner determines each color image by determining when the proportion of the color blocks is greater than or equal to a predetermined threshold, and determines each monochrome image by determining when the proportion of the color blocks is less than the predetermined threshold.

5. The image forming apparatus as claimed in claim 1, wherein each image is determined to be color image or monochrome image based on one of the proportion of the classified blocks and a connectivity of the classified color blocks, wherein a presence of connectivity or an absence of connectivity is determined by a number of continuous blocks in the image.

6. A method of processing image, a method comprising:
scanning a document having a plurality of sheets to generate one image for each sheet of the document;
dividing each generated image into a predetermined number of blocks;
calculating an average of color signals of pixels in each of the blocks such that each of the pixels has a color signal;
comparing the calculated average with a predetermined threshold;
classifying the blocks into color blocks and monochrome blocks based on whether the calculated average is greater than or less than the predetermined threshold;
determining whether each generated image is a color image or a monochrome image according to a proportion of the color blocks; and
performing a color printing of each sheet having the image which is determined to be the color image, and performing a monochrome printing of each sheet having the image which is determined to be the monochrome image.

* * * * *